US010956137B2

(12) United States Patent
Waltenberg et al.

(10) Patent No.: US 10,956,137 B2
(45) Date of Patent: Mar. 23, 2021

(54) COMPILING SOURCE CODE USING SOURCE CODE TRANSFORMATIONS SELECTED USING BENCHMARK DATA

(71) Applicant: INTERNATIONAL BUSINESS MACHINES CORPORATION, Armonk, NY (US)

(72) Inventors: Peter T. Waltenberg, Gold Coast (AU); Narayana A. Madineni, Southport (AU); Alexander John Hennekam, Gold Coast (AU)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 0 days.

(21) Appl. No.: 16/435,987

(22) Filed: Jun. 10, 2019

(65) Prior Publication Data
US 2020/0387363 A1 Dec. 10, 2020

(51) Int. Cl.
*G06F 9/44* (2018.01)
*G06F 9/445* (2018.01)
(Continued)

(52) U.S. Cl.
CPC ............... *G06F 8/443* (2013.01); *G06F 8/53* (2013.01); *G06F 8/71* (2013.01)

(58) Field of Classification Search
CPC .............. G06F 8/443; G06F 8/53; G06F 8/71
See application file for complete search history.

(56) References Cited

U.S. PATENT DOCUMENTS 6,226,790 B1 * 5/2001 Wolf ................... G06F 8/4441
717/135
6,345,384 B1 2/2002 Sato
(Continued)

OTHER PUBLICATIONS

Yves Lhuillier, Parallel architecture benchmarking: from embedded computing to HPC, a FiPS project perspective, 2014, pp. 151-164. https://ieeexplore.ieee.org/stamp/stamp.jsp?tp=&arnumber=6962280 &isnumber=6962250 (Year: 2014).*

(Continued)

*Primary Examiner* — Mongbao Nguyen
(74) *Attorney, Agent, or Firm* — Cuenot, Forsythe & Kim, LLC (57) ABSTRACT

A source code and architecture information for at least one data processing environment in which a first executable program code compiled from the source code is to be configured to be executed can be received. The source code can be compiled to generate the first executable program code. The compiling the source code can include selecting, using a processor, from a plurality of source code transformations, a source code transformation to apply to compile a portion of the source code based on a plurality of sets of benchmark data, each of the sets of benchmark data comprising data indicating an efficiency of a portion of another executable program code compiled using a respective source code transformation at executing in the at least one data processing environment. The compiling the source code also can include compiling the portion of the source code using the selected source code transformation.

20 Claims, 6 Drawing Sheets

(51) Int. Cl.
*G06F 8/41* (2018.01)
*G06F 8/53* (2018.01)
*G06F 8/71* (2018.01)

(56) References Cited

U.S. PATENT DOCUMENTS

| | | | |
|---|---|---|---|
| 9,535,672 B2 | 1/2017 | Cabillic et al. | |
| 9,552,193 B2 | 1/2017 | McEwan | |
| 9,727,317 B2 | 8/2017 | Gao et al. | |
| 2008/0034360 A1* | 2/2008 | Bodin | G06F 8/443 717/154 |
| 2008/0115120 A1* | 5/2008 | Clifton | G06F 8/443 717/153 |
| 2011/0138373 A1 | 6/2011 | Lane et al. | |
| 2012/0198428 A1* | 8/2012 | Schmidt | G06F 9/30174 717/153 |
| 2014/0282454 A1* | 9/2014 | Bai | G06F 8/433 717/157 |
| 2015/0227350 A1* | 8/2015 | Kannan | G06F 3/04847 717/140 |
| 2015/0309779 A1* | 10/2015 | Baskaran | G06F 8/4432 717/154 |
| 2016/0321032 A1* | 11/2016 | Cammarota | G06F 8/00 |
| 2017/0262309 A1 | 9/2017 | Crowther et al. | |
| 2017/0371635 A1* | 12/2017 | Davidson | G06F 8/52 |
| 2018/0101370 A1* | 4/2018 | Huang | G06F 8/443 |
| 2018/0253291 A1* | 9/2018 | Jeon | G06F 8/434 |
| 2019/0042224 A1* | 2/2019 | Caballero de Gea | G06F 8/4441 |
| 2019/0146764 A1* | 5/2019 | Ravindar | G06F 8/443 717/151 |
| 2020/0269420 A1* | 8/2020 | Miyajima | B25J 9/1664 |

OTHER PUBLICATIONS

Mohammad Dashi, Compiling Database Application Programs, 2018, pp. 1-16. https://arxiv.org/pdf/180709887.pdf (Year: 2016).*
Sebastian Ertel, Compiling for Concise Code and Efficient I/O, 2018, pp. 104-114. https://dl.acm.org/doi/pdf/10.1145/3178372.3179505 (Year: 2018).*
Wang, Z. et al., "Machine learning in compiler optimization," Proceedings of the IEEE, May 10, 2018, vol. 99, pp. 1-23.
Ashouri, A.H. et al., "Selecting the Best Compiler Optimizations: A Bayesian Network Approach," In Automatic Tuning of Compilers Using Machine Learning 2018, pp. 41-70, Springer, Cham.
"Peephole Optimization," [online] Wikipedia the Free Encyclopedia, Jun. 7, 2019, [retrieved Jun. 10, 2019], retrieved from the Internet: <https://en.wikipedia.org/w/index.php?title=Peephole_optimization&oldid=900779904>, 4 pg.

* cited by examiner

FIG. 1

| Source Code Transf. ID | Data Proc. Env. ID | No. of Op's | No. of Clock Cycles | Execute Time (ns) | Excep's Trigg'd | Local Memory Used (kB) | L1 Cache Used (kB) | L2 Cache Used (kB) | L3 Cache Used (kB) |
|---|---|---|---|---|---|---|---|---|---|
| 10eb2341 | 1000 | 2176 | 108 | 26.7 | 10, 13 | 3232 | 96 | 256 | |
| 10eb2341 | 1002 | 2045 | 66 | 15.2 | | 956 | 72 | 228 | 844 |
| 10eb2341 | 1004 | 2489 | 78 | 19.5 | | 4048 | 85 | 272 | 1154 |
| ... | | | | | | | | | |
| ab7cde5b | 1000 | 3356 | 104 | 25.7 | | 2968 | 88 | 264 | |
| ab7cde5b | 1002 | 2686 | 86 | 19.8 | 16 | 1004 | 72 | 222 | 822 |
| ab7cde5b | 1004 | 2944 | 92 | 23.0 | | 3689 | 80 | 266 | 1036 |

Receive a source code and architecture information for at least one data processing environment in which a first executable program code compiled from the source code is to be configured to be executed
402

Compile the source code to generate the first executable program code, the compiling the source code comprising selecting, using a processor, from a plurality of source code transformations, a source code transformation to apply to compile a portion of the source code based on a plurality of sets of benchmark data, each of the sets of benchmark data comprising data indicating an efficiency of a portion of another executable program code compiled using a respective source code transformation at executing in the at least one data processing environment and compiling the portion of the source code using the selected source code transformation
404

Communicate the first executable program code to a first data processing environment having a first architecture and, responsive to the first data processing environment executing the first executable program code, receiving from the first data processing environment a plurality of first sets of benchmark data, each of the plurality of first sets of the first benchmark data indicating an efficiency of the first data processing environment at processing a respective portion of the first executable program code
406

Create a correspondence between each of the plurality of first sets of first benchmark data, a respective source code transformation used to generate the respective portion of the first executable program code, and the first architecture of the first data processing environment
408

Source Code

Intermediate Code

600 →
```
MOV b, R0   ; Copy b to the register
ADD c, R0   ; Add c to the register, the register is now b+c
MOV R0, a   ; Copy the register to a
MOV a, R0   ; Copy a to the register
ADD e, R0   ; Add e to the register, the register is now a+e [(b+c)+e]
MOV R0, d   ; Copy the register to d
```

FIG. 6

Optimized Intermediate Code

700 →
```
MOV b, R0   ; Copy b to the register
ADD c, R0   ; Add c to the register, which is now b+c (a)
MOV R0, a   ; Copy the register to a
ADD e, R0   ; Add e to the register, which is now b+c+e [(a)+e]
MOV R0, d   ; Copy the register to d
```

FIG. 7

COMPILING SOURCE CODE USING SOURCE CODE TRANSFORMATIONS SELECTED USING BENCHMARK DATA

BACKGROUND

The present invention relates to computer programming, and more specifically, to compiling computer program code.

A compiler is a computer program that translates computer program code written in one programming language, the source language, into another programming language, the target language. A compiler typically translates source code from a high-level programming language to a low-level language (e.g., assembly language, object code, or machine code) to create an executable program.

SUMMARY

In one or more embodiments, a method includes receiving a source code and architecture information for at least one data processing environment in which a first executable program code compiled from the source code is to be configured to be executed. The method also can include compiling the source code to generate the first executable program code. The compiling the source code can include selecting, using a processor, from a plurality of source code transformations, a source code transformation to apply to compile a portion of the source code based on a plurality of sets of benchmark data, each of the sets of benchmark data including data indicating an efficiency of a portion of another executable program code compiled using a respective source code transformation at executing in the at least one data processing environment. The compiling the source code also can include compiling the portion of the source code using the selected source code transformation.

In one or more embodiments, a system includes a processor configured to initiate executable operations. The executable operations include receiving a source code and architecture information for at least one data processing environment in which a first executable program code compiled from the source code is to be configured to be executed. The executable operations also can include compiling the source code to generate the first executable program code. The compiling the source code can include selecting from a plurality of source code transformations, a source code transformation to apply to compile a portion of the source code based on a plurality of sets of benchmark data, each of the sets of benchmark data including data indicating an efficiency of a portion of another executable program code compiled using a respective source code transformation at executing in the at least one data processing environment. The compiling the source code also can include compiling the portion of the source code using the selected source code transformation.

In one or more embodiments, a computer program product includes a computer readable storage medium having program code stored thereon. The program code is executable by a processor to initiate operations. The operations include receiving a source code and architecture information for at least one data processing environment in which a first executable program code compiled from the source code is to be configured to be executed. The operations also can include compiling the source code to generate the first executable program code. The compiling the source code can include selecting from a plurality of source code transformations, a source code transformation to apply to compile a portion of the source code based on a plurality of sets of benchmark data, each of the sets of benchmark data including data indicating an efficiency of a portion of another executable program code compiled using a respective source code transformation at executing in the at least one data processing environment. The compiling the source code also can include compiling the portion of the source code using the selected source code transformation.

This Summary section is provided merely to introduce certain concepts and not to identify any key or essential features of the claimed subject matter. Other features of the inventive arrangements will be apparent from the accompanying drawings and from the following detailed description.

BRIEF DESCRIPTION OF THE DRAWINGS

The inventive arrangements are illustrated by way of example in the accompanying drawings. The drawings, however, should not be construed to be limiting of the inventive arrangements to only the particular implementations shown. Various aspects and advantages will become apparent upon review of the following detailed description and upon reference to the drawings.

DETAILED DESCRIPTION

While the disclosure concludes with claims defining novel features, it is believed that the various features described within this disclosure will be better understood from a consideration of the description in conjunction with the drawings. The process(es), machine(s), manufacture(s) and any variations thereof described herein are provided for purposes of illustration. Specific structural and functional details described within this disclosure are not to be interpreted as limiting, but merely as a basis for the claims and as a representative basis for teaching one skilled in the art to variously employ the features described in virtually any appropriately detailed structure. Further, the terms and phrases used within this disclosure are not intended to be limiting, but rather to provide an understandable description of the features described.

This disclosure relates to computer programming, and more specifically, to compiling source code. In accordance with the inventive arrangements disclosed herein, automated compiler optimization can be implemented using a data processing system. Compiler optimization applies a sequence of optimizing source code transformations on the source code to produce semantically equivalent executable program code that minimizes or maximizes attributes of a program. The attributes can be time taken to execute the program, memory utilization or the power consumed.

The data processing system can use machine learning techniques to provide compiler optimization as a service to multiple software products from multiple vendors. Specifically, the data processing system can use benchmark data retained from past optimizations of a multiplicity of software products to optimize new service requests. Moreover, the data processing system can gather and store additional benchmark data each time new program code is compiled. For example, each time the data processing system compiles source code to generate executable program code, the data processing system can initiate one or more data processing environments (e.g., computing architectures) to execute the executable program code and generate benchmark data for such executions. Thus, the optimizations provided by the source code transformations will improve over time.

The benchmark data can be very granular in nature, for example by indicating the performance of a very small number of instructions. In this regard, each source code transformation that is applied to compiling the source code can be limited to a small number of instructions. Thus, application of the source code transformations to compiling the source code can be very granular in nature. For example, the source code transformations can be applied to perform peephole optimization.

The data processing system described herein provides optimizations which traditional compilers do not provide due to run-time and compiler development costs that would be required to provide the optimizations using known techniques. Unlike using a normal compiler, the data processing system benchmarks various possible instruction sequences, specified by source code transformations, on target computing architectures and stores a list of possible ways of solving the same problem in the application context, and then picks the way that provides efficient use of computing resources. Accordingly, compiler optimizations implemented in accordance with the inventive arrangements described herein improve resource usage by computer programs, thus improving performance of data processing systems which execute the computer programs. In illustration, the optimizations described herein improve the performance of executing a variety of types of computer instructions, for example, SIMD Extensions 3 (SSSE3) instructions, 4× SSE3 instructions, advanced vector extensions (AVX) instructions, as well as other types of instructions.

Several definitions that apply throughout this document now will be presented.

As defined herein, the term "source code" means a collection of statements in which a computer-program is written before translation into executable program code. Source code usually is written as plain text using a high-level programming language, and may be translated to an intermediate representation of the source code (i.e., intermediate code) before compiling. Source code may include comments, and typically is initially written with a strong abstraction from details of an instruction set architecture of data processing systems on which executable program code, derived by compiling the source code, is configured to be executed. A compiler also can receive source code in the form of intermediate code, in which case the compiler may directly compile the source code without need for the compiler to translate the source code into the intermediate code before compiling the source code.

As defined herein, the term "intermediate code" means a data structure or code used internally by a compiler to represent source code. The compiler may convert source code to an intermediate code version of the source code and compile the intermediate code version of the source code, or receive the source code in the form of intermediate code and compile that version of the source code.

As defined herein, the term "high-level programming language" means a computer programming language whose instructions or statements each correspond to several machine language instructions. Examples of a high-level programming language include, but are not limited to, human-readable programming languages such as C, C++, BASIC, Pascal, Fortran, COBOL, LISP, ALGOL, APL, PL/I, RPG, etc.

As defined herein, the term "executable program code" means a collection of computer program code, compiled from source code into a low-level programming language, configured to be executed by at least one processor. Executable program code usually includes more than one machine instruction for each symbolic statement contained in the source code.

As defined herein, the term "low-level programming language" means a computer programming language consisting of mnemonics that directly correspond to machine language instructions. In this regard, a low-level programming language provides little or no abstraction from details of an instruction set architecture of data processing systems on which executable program code is configured to be executed. Examples of a low-level programming language include, but are not limited to, machine code, assembly code and byte code.

As defined herein, the term "compiler" means a computer program that translates source code written in one programming language, the source language, into executable program code written in another programming language, the target language.

As defined herein, the term "compile" means to generate executable program code from source code by translating the source code into the executable program code.

As defined herein, the term "source code transformation" means a compiler instruction for translating a portion of source code (e.g., a portion of an intermediate code version of the source code) into a portion of executable program code.

As defined herein, the term "architecture information" means information indicating an architecture of a data processing environment.

As defined herein, the term "benchmark data" means data that indicates efficiencies at which executable program code executes in at least one data processing environment.

As defined herein, the term "set of benchmark data" means data that indicates an efficiency at which a particular portion of executable program code, generated from a portion of source code using a respective source code transformation, executes in a respective data processing environment.

As defined herein, the term "responsive to" means responding or reacting readily to an action or event. Thus, if a second action is performed "responsive to" a first action, there is a causal relationship between an occurrence of the first action and an occurrence of the second action, and the term "responsive to" indicates such causal relationship.

As defined herein, the term "data processing system" means one or more hardware systems configured to process data, each hardware system including at least one processor programmed to initiate executable operations and memory.

As defined herein, the term "processor" means at least one hardware circuit (e.g., an integrated circuit) configured to carry out instructions contained in program code. Examples of a processor include, but are not limited to, a central processing unit (CPU), an array processor, a vector processor, a digital signal processor (DSP), a field-programmable gate array (FPGA), a programmable logic array (PLA), an application specific integrated circuit (ASIC), programmable logic circuitry, and a controller.

As defined herein, the term "server" means a data processing system configured to share services with one or more other data processing systems.

As defined herein, the term "client device" means a data processing system that requests shared services from a server, and with which a user directly interacts. Examples of a client device include, but are not limited to, a workstation, a desktop computer, a computer terminal, a mobile computer, a laptop computer, a netbook computer, a tablet computer, a smart phone, a personal digital assistant, a smart watch, smart glasses, a gaming device, a set-top box, a smart television and the like. Network infrastructure, such as routers, firewalls, switches, access points and the like, are not client devices as the term "client device" is defined herein.

As defined herein, the term "real time" means a level of processing responsiveness that a user or system senses as sufficiently immediate for a particular process or determination to be made, or that enables the processor to keep up with some external process.

As defined herein, the term "automatically" means without user intervention.

As defined herein, the term "user" means a person (i.e., a human being).

Figure 1:
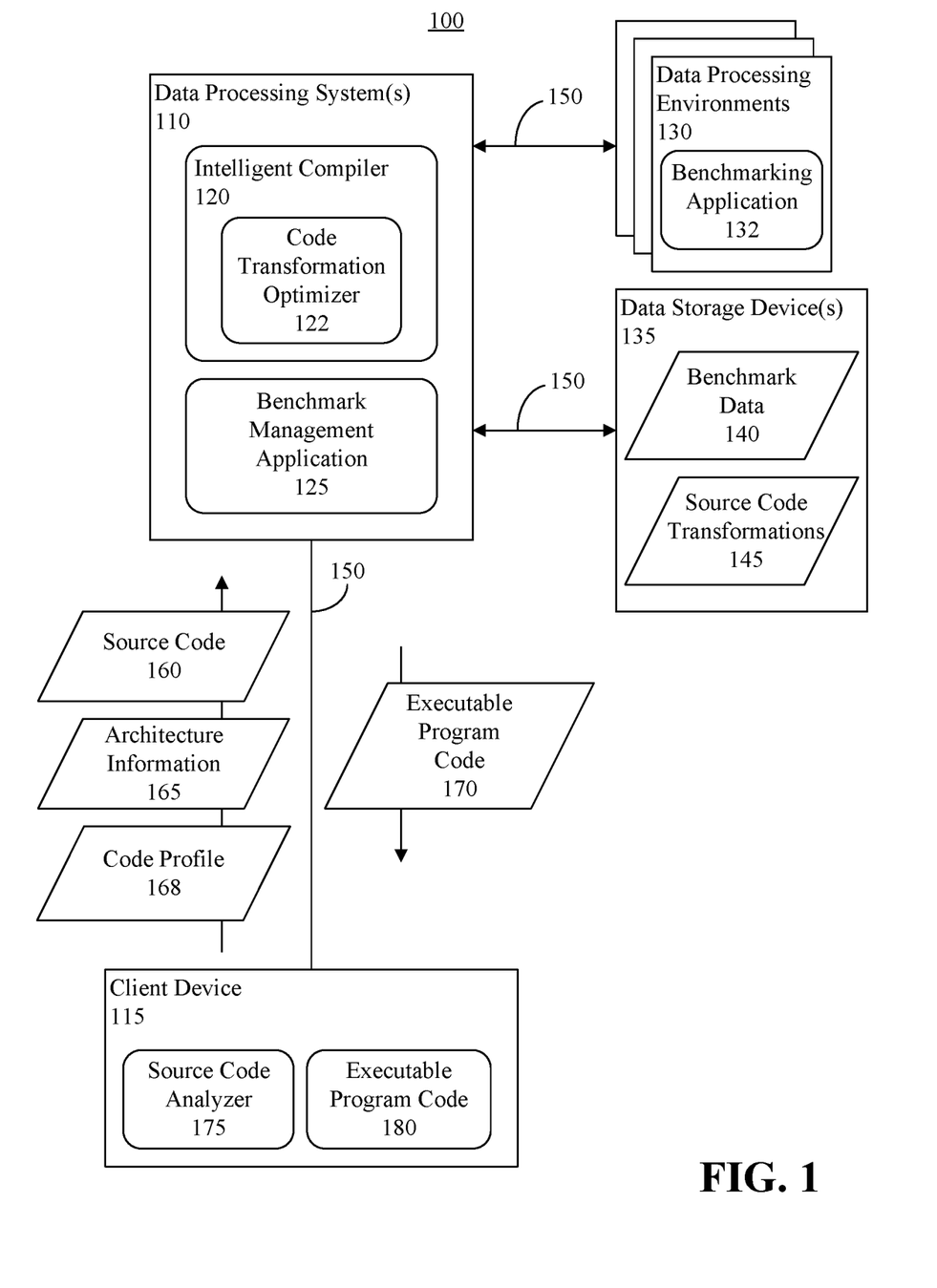
FIG. 1 illustrates an example of a network computing environment.

FIG. 1 is a block diagram illustrating an example of a network computing environment 100. The network computing environment 100 can include at least one data processing system 110, for example a server, and at least one client device 115. The data processing system 110 can include an intelligent compiler 120, which can include a code transformation optimizer 122, and a benchmark management application 125. The intelligent compiler 120 and benchmark management application 125 will be described herein in further detail.

The network computing environment 100 also can include a plurality of data processing environments 130. An example of a data processing environment 130 is a data processing system, comprising a processor and memory. Another example of a data processing environment 130 is a virtualized environment, such as a virtual machine. In such an arrangement, one or more virtualized environments can be hosted by the data processing system 110, though this need not be the case. For instance, one or more virtualized environments can be hosted by one or more other data processing systems to which the data processing system 110 is communicatively linked. In arrangements in which a data processing environment 130 is a data processing system other than the data processing system 110, or a data processing environment 130 is a virtual machine hosted by another data processing system, the data processing environments each can execute a respective copy of a benchmarking application 132.

The network computing environment 100 further can include at least one data storage device 135 in which benchmark data 140 and source code transformations 145 is stored, for example within one or more data tables (e.g., database tables). The data storage device 135 can be a component of the data processing system 110 or otherwise communicatively linked to the data processing system. For instance, the data storage device 135 can be a network attached storage (NAS) to which the data processing system 110 is communicatively linked. In a non-limiting arrangement, the benchmark data 140 and the source code transformations 145 can be stored to different data storage devices 135. The benchmark data 140 and the source code transformations 145 will be described herein in further detail.

The client device 115 can be communicatively linked to the data processing system 110 via at least one communication network 150. In the case that the data processing environment(s) 130 is/are external to the data processing system 110, the data processing environment(s) also can be communicatively linked to the data processing system 110 via at least one communication network 150. Similarly, in the case that data storage device 135 is external to the data processing system 110, the data storage device 135 can be communicatively linked to the data processing system 110 via at least one communication network 150.

The communication network 150 is the medium used to provide communications links between various devices and data processing systems connected together within the network computing environment 100. The communication network 150 may include connections, such as wire, wireless communication links, or fiber optic cables. The communication network 150 can be implemented as, or include, any of a variety of different communication technologies such as a wide area network (WAN), a local area network (LAN), a wireless network, a mobile network, a Virtual Private Network (VPN), the Internet, the Public Switched Telephone Network (PSTN), or similar technologies.

In operation, the data processing system 110 can provide to client devices, such as the client device 115, computer code compilation services using the intelligent compiler 120. In illustration, the client device 115 can access the data processing system 110 and request use of the computer code compilation services, for example by accessing a web portal provided by the data processing system 110, communicating a request to the data processing system 110, etc. Further, the client device 115 can communicate to the data processing system 110 source code 160 and architecture information 165. The source code 160 can be computer program code written in a high-level programming language. In a non-limiting arrangement, the client device 115 can communicate the source code 160 as a plurality of modules that are to be compiled.

The architecture information 165 can include information indicating a type of data processing environment for which executable program code 170 is to be optimized, for instance a computer hardware architecture and/or software architecture. The architecture information 165 can indicate, for example, a type of processor on which the executable program code 170 will be executed (e.g., a processor that uses an IBM® Power Architecture®, a processor that uses an x86 instruction set architecture, a processor that uses an X86 instruction set architecture, a processor that uses an is-64 instruction set architecture, a processor that uses an ARM instruction set architecture, and so on). The architecture information 165 also can indicate, for example, a memory architecture for a data processing system on which the executable program code 170 will be executed. For instance, the architecture information 165 can indicate a number of memory channels (e.g., one, two, three, four, etc.), a type of memory (e.g., DDR, DDR2, DDR3, DDR4, etc.), an amount of memory, a number of levels of cache memory (e.g., L1, L2, L3, etc.), an amount of memory at each cache memory level, and so on. Further, the architecture information 165 can indicate, for example, hardware components, peripherals and/or other software (e.g., operating system, drivers, services, Graphics processors, FPGA's etc.) that will be used in a data processing environment during execution of the executable program code 170.

In a non-limiting arrangement, in addition to communicating the source code 160 and the architecture information 165, the client device 115 further can perform a client-side analysis of the source code 160 and communicate a code profile 168 resulting from such analysis to the data processing system 110. In illustration, the client device 115 can include a source code analyzer 175 configured to analyze the source code 160. For instance, the source code analyzer 175 can analyze executable program code 180 previously generated by compiling the source code 160. By way of example, the client device 115 can compile the source code 160 locally using local compiler, and the source code analyzer 175 can analyze the executable program code 180 generated during that compile. In another example, another data processing system to which the client device 115 is communicatively linked can compile the source code 160 and communicate the resulting executable program code 180 to the client device 115. The source code analyzer 175 can analyze that version of the executable program code 180 to generate the code profile 168.

During the analysis, the client device 115 can execute the executable program code 180, and the source code analyzer 175 can monitor and analyze the executable program code 180 as it executes. Based on the analysis, the source code analyzer 175 can create the code profile 168 for the executable program code 180, and thus for the source code 160. The analyzing can include identifying portions of the executable program code 180 that utilize one or more resources (e.g., processor core(s), memory, etc.) above a threshold level, trigger exceptions, etc., and determining portions of the source code 160 from which those portions of the executable program code 180 are generated. The results of the analysis can indicate that those portions of the source code 160 are in need of optimization during the compile process to be performed by the intelligent compiler 120. In the case that the source code 160 defines and/or manipulates objects, the results of the analysis can indicate such objects as being in need of optimization.

The source code analyzer 175 also can remove comments from the source code 160, or can otherwise obfuscate the source code 160 prior to communicating the source code 160 to the data processing system 110. This can serve to enhance the protection of the client's intellectual property.

In a non-limiting arrangement, rather than communicating the source code 160 to the data processing system 110, the client device 115 can communicate to the data processing system 110 an abstract representation of the source code 160. The abstract representation of the source code 160 can be a list of a sequence of operations to be executed, for example as an intermediate code version of the source code 160. Hereinafter reference will be made to "source code," but those of ordinary skill in the art will appreciate that an abstract representation of the source code 160 can be used in lieu of the source code 160.

Responsive to receiving the source code 160 and architecture information 165, the intelligent compiler 120 can compile the source code 160 to generate executable program code 170 optimized for execution on the target architecture(s) indicated by the architecture information 165, and communicate the executable program code 170 to the client device 115. The executable program code 170 can be computer program code in the form of a low-level programming language which is executable by a processor. In the case that the source code 160 is provided to the data processing system 110 as a plurality of modules, the intelligent compiler 120 can compile the modules and communicate the resulting executable modules to the client device 115 as the executable program code 170.

During the compilation of the source code 160 by the intelligent compiler 120 to generate the executable program code 170, the code transformation optimizer 122 can select one or more source code transformations 145 to apply to compiling one or more portions of the source code 160 based on the benchmark data 140. The source code transformations are selected to optimize the executable program code that is generated from compiling the source code 160. In illustration, assume that the code profile 168 indicates portions of the source code 160 that are in need of optimization (e.g., use of data processing resources by those portions of the source code 160 is inefficient). The code transformation optimizer 122 can access the benchmark data 140 and identify in the benchmark data 140 source code transformations 145 applicable to the indicated portions of the source code 160 and that provide a high level of performance when those source code transformations 145 are used to compile source code for execution in a data processing environment 130 corresponding to the architecture information 165.

In another example, the code transformation optimizer 122 can analyze the source code 160. During the analysis, the code transformation optimizer 122 can perform a semantic analysis of the source code 160 and identify portions of the source code 160 for which one or more source code transformations 145 are available and/or recommended. In illustration, the intelligent compiler 120 can analyze the source code 160 itself and/or the intelligent compiler 120 can generate an intermediate code version of the source code 160 and analyze the intermediate code of the source code 160. The source code 160 can be communicated from the client device 115 to the data processing system 110 as intermediate code, or the intelligent compiler 120 can generate the intermediate code from the source code 160. Regardless, the code transformation optimizer 122 can identify, in the source code 160 or the intermediate code version of the source code 160, individual instructions and/or sets of related instructions. The code transformation optimizer 122 can compare the identified instructions/instruction sets to instructions/instruction sets for which source code transformations 145 are available in the data storage device(s) 135. An instruction set can be, for example, a sequence of instructions in which parameters and/or values are passed between the sequence of instructions. In another example, an instruction set can be a sequence of instructions that operate on the parameters and/or values.

With regard to selecting source code transformations 145 to optimize a portion of source code 160, such as an instruction or sequence of instructions, assume that there are three source code transformations 145 identified by the code transformation optimizer 122 that are available for use in compiling a portion of the source code 160 for the target architecture (e.g., a target data processing environment) indicated in the architecture information 165. For instance, the source code transformations 145 can be configured to replace a portion of the source code 160, or replace a portion of the intermediate code version of the source code 160, that corresponds to the portion of the source code 160. The code transformation optimizer 122 can identify in the benchmark data 140 a set of benchmarks for each of those source code transformations 145 indicating performance of the source code transformations on the target architecture. The code transformation optimizer 122 can select, from among the identified source code transformations 145, the source code transformation 145 having the highest performance (e.g., using the lowest number of processor operations and/or clock cycles, having the lowest execution time, not triggering exceptions, using the lowest amount of local memory and/or cache memory, etc.). The code transformation optimizer 122 can replace the portion of the source code 160, or the intermediate code version of the source code 160, with the selected source code transformation 145 prior to the intelligent compiler 120 translating the source code 160, or the intermediate code version of the source code 160, into the executable program code 170.

In the case that the architecture information 165 indicates a plurality of target architectures (i.e., target data processing environments), the code transformation optimizer 122 can identify in the benchmark data 140 sets of benchmarks for each of those source code transformations 145 indicating performance of the source code transformations on each of the target architectures. For each source code transformation 145, the code transformation optimizer 122 can determine an average value (e.g., a mean, mode or median) of each performance parameter indicated in the sets of benchmarks applicable to that source code transformation 145, and select the source code transformation 145 having the highest average performance. In a non-limiting arrangement, the code transformation optimizer 122 can exclude from the selection a source code transformation 145 that triggers one or more exceptions in one or more of the target architectures.

In some cases benchmark data 140 for a particular source code transformation 145 may not yet exist for a particular target architecture. In such cases, the code transformation optimizer 122 can select that source code transformation 145 for use in compiling the source code 160 by the intelligent compiler 120, and initiate the data processing system 110 to communicate the resulting executable program code to a data processing environment 130 corresponding to the target architecture. That data processing environment 130 can execute the executable program code and, during the execution, the corresponding benchmarking application 132 can generate corresponding benchmark data. The benchmarking application 132 can communicate corresponding benchmark data to the benchmark management application 125, which can add that received benchmark data to the benchmark data 140. The code transformation optimizer 122 then can repeat the above described process of selecting the source code transformation 145 providing the highest performance, this time including in the analysis the benchmark data received from the benchmarking application 132, as well as benchmark data for other source code transformations 145 that may be considered.

In this regard, the benchmark data 140 can include a plurality of sets of benchmark data 140 indicating the performance of portions of previously generated executable program code, generated using the source code transformations 145, at executing in various data processing environments 130. Responsive to a respective data processing environment 130 executing executable program code, the benchmarking application 132 of that data processing environment 130 can monitor the execution of the executable program code and generate respective sets of benchmark data 140. In the case that a data processing environment 130 is hosted by the data processing system 110, the data processing system 110 and/or that data processing environment 130 also can execute a copy of the benchmarking application 132 to monitor execution of executable program code and generate respective sets of benchmark data 140. The monitoring performed by each benchmarking application 132 can include monitoring various parameters indicating data processing performance. Such parameters include, but are not limited to, examples depicted in FIG. 2 and described below.

Responsive to generating one or more sets of benchmark data, the respective benchmarking application 132 can communicate those sets of benchmark data to the benchmark management application 125. Responsive to receiving the set(s) of benchmark data, the benchmark management application 125 can add the set(s) of benchmark data to the benchmark data 140. Accordingly, the benchmark data 140 can be expanded each time source code 160 is compiled to generate executable program code. Further, the benchmark management application 125 can be configured to maintain the benchmark data 140, for example by periodically deleting stale data (e.g., data older than a threshold period, data for data processing environments 130 that have been updated, etc.).

Further, the code transformation optimizer 122 can implement techniques, such as a genetic programming, to improve frequently appearing code sequences. Genetic programming is known in the field of artificial intelligence and includes encoding computer programs as a set of genes that are then modified using an evolutionary algorithm. In illustration, the code transformation optimizer 122 can initiate a sequence of processes in which source code transformations 145 are selected, the source code is compiled using the selected source code transformations 145 and executed in one or more data processing environments 130, and benchmark data is generated and stored as previously described. After the first process in the sequence, the code transformation optimizer 122 can select one or more different source code transformations 145 and initiate a second process in the sequence. The code transformation optimizer 122 can compare benchmark data 140 generated during the second process to benchmark data 140 generated during the first process, and identify source code transformations 145 applied in the second process that improve, and those that do not improve, the performance of the resulting executable program code in comparison to the source code transformations 145 applied in the first process. After the second process in the sequence, the code transformation optimizer 122 can select one or more different source code transformations 145 and initiate a third process in the sequence. The code transformation optimizer 122 can compare benchmark data 140 generated during the third process to benchmark data 140 generated during the first and second processes. The source code transformation optimizer 122 can continue the sequence of processes until a predefined number of processes have been completed. The source code transformation optimizer 122 then can analyze the benchmark data 140 generated during each of the processes and identify source code transformations 145 whose benchmark data 140 indicates the highest level of performance in the target data processing environments 130. The source code transformation optimizer 122 can select the identified source code transformations 145 for use in compiling the source code 160 to generate the executable program code 170 that is delivered to the client device 115.

At this point it should be noted that the operations described herein performed by the data processing system(s) 110 and data processing environments 130 can be performed automatically, in real time, in response to the data processing system 110 receiving the source code 160 and architecture information 165 from the client device 115.

Figure 2:
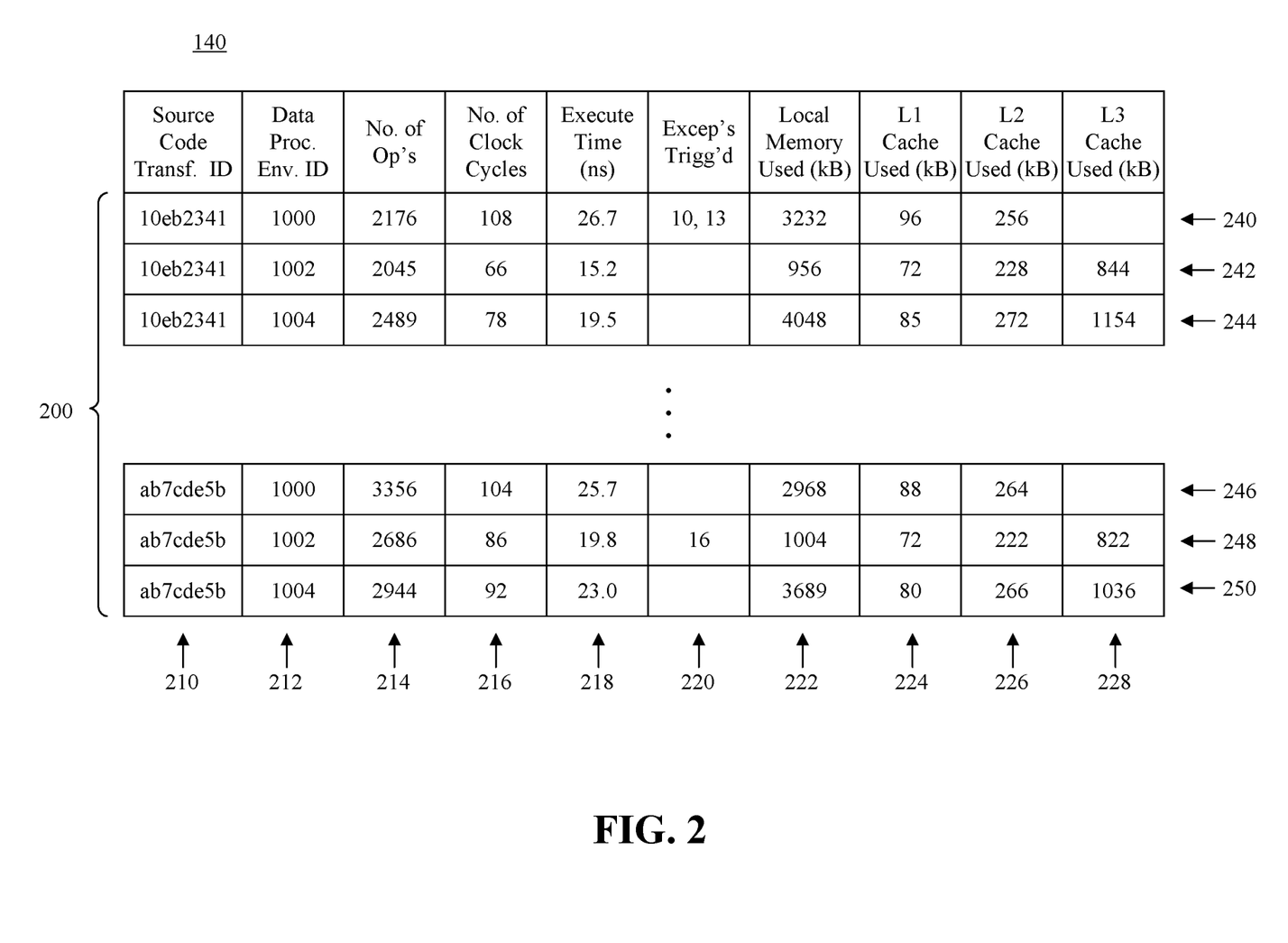
FIG. 2 illustrates examples of sets of benchmark data.

FIG. 2 illustrates examples of sets 200 of benchmark data 140. Each of the plurality of sets 200 of benchmark data 140 can indicate an efficiency at which a particular portion of executable program code, generated from a portion of source code using a respective source code transformation 145, executes in a respective data processing environment 130. In illustration, the benchmark data 140 can include a plurality of columns, for example a column 210 in which identifiers for source code transformations 145 is stored, a column 212 in which identifiers for data processing environments 130 is stored, and columns 214, 216, 218, 220, 222, 224, 226, 228 in which performance parameters are stored indicating the performance of portions of executable program code generated using the respective source code transformations 145 in the respective data processing environments 130. By way of example, column 214 can include a value indicating a number of operations performed to execute the portion of the executable program code, column 216 can include a value indicating a number of clock cycles used to execute the portion of the executable program code, column 218 can include a value indicating an amount of time used to execute the portion of the executable program code, column 220 can include values indicating exceptions (e.g., errors, interrupts, etc.) triggered by execution of the portion of the executable program code (if any), column 222 can include a value indicating an amount of local memory used by the portion of the executable program code, column 224 can include a value indicating an amount of L1 cache used by the portion of the executable program code, column 226 can include a value indicating an amount of L2 cache used by the portion of the executable program code, and column 228 can include a value indicating an amount of L3 cache used by the portion of the executable program code. If a processor in a particular data processing environment does not include L3 cache, that column need not include data.

The plurality of sets 200 of the benchmark data 140 can include a plurality of rows 240, 242, 244, 246, 248, 250, with each row 240-250 representing a particular set 200 of the benchmark data for a particular source code transformation 145 and a particular data processing environment 130. Further, each row 240-250 can include data indicating performance of the data processing environment 130 at executing a portion of executable program code generated using the particular source code transformation 145. In illustration, row 240 can include a set of benchmark data including the identifiers "10eb2341" and "1000" in the respective columns 210, 212, and data values in the columns 214-228 generated by monitoring execution in a data processing environment assigned the identifier "1000" of a portion of executable program code generated using a source code transformation assigned the identifier "10eb2341." Row 242 can include a set of benchmark data including the identifiers "10eb2341" and "1002" in the respective columns 210, 212 and data values in the columns 214-228 generated by monitoring execution in a data processing environment assigned the identifier "1002" of a portion of executable program code generated using the source code transformation assigned the identifier "10eb2341." Row 244 can include a set of benchmark data including the identifiers "10eb2341" and "1004" in the respective columns 210, 212 and data values in the columns 214-228 generated by monitoring execution in a data processing environment assigned the identifier "1004" of a portion of executable program code generated using the source code transformation assigned the identifier "10eb2341." Row 246 can include a set of benchmark data including the identifiers "ab7cde5b" and "1000" in the respective columns 210, 212 and data values in the columns 214-228 generated by monitoring execution in the data processing environment assigned the identifier "1000" of a portion of executable program code generated using a source code transformation assigned the identifier "ab7cde5b," and so on.

Each of the sets 200 of benchmark data 140 can be considered to be micro-benchmark data in that each set 200 applies to a particular source code transformation 145, which can correspond to a single instruction in the source code 160, or can correspond to reordering of a sequence of instructions. For example, a source code transformation 145 can reorder a sequence of instructions to remove, load and/or store dependencies. In another example, a source code transformation 145 can replace an instruction in the source code 160 with an unexpected instruction, for instance using a shift instruction in lieu of a multiplication for some values. Another example of a source code transformation 145 is a source code transformation 145 that implements a peephole optimization. A peephole optimization is an optimization of a very small set of instructions, for example in the intermediate code version of the source code 160, to replace the set of instructions with a set of fewer instructions, or to replace the set of instructions with a set of instructions that execute faster and/or utilize less system resources in the target computing architecture. A set of instructions optimized using a peephole optimization can be, for example, one instruction or a sequence of instructions that includes than a threshold number of instructions. (e.g., less than two instructions, less than three instructions, less than four instructions, less than five instructions, less than six instructions, less than seven instructions, less than eight instructions, less than nine instructions or less than ten instructions).

Figure 3:
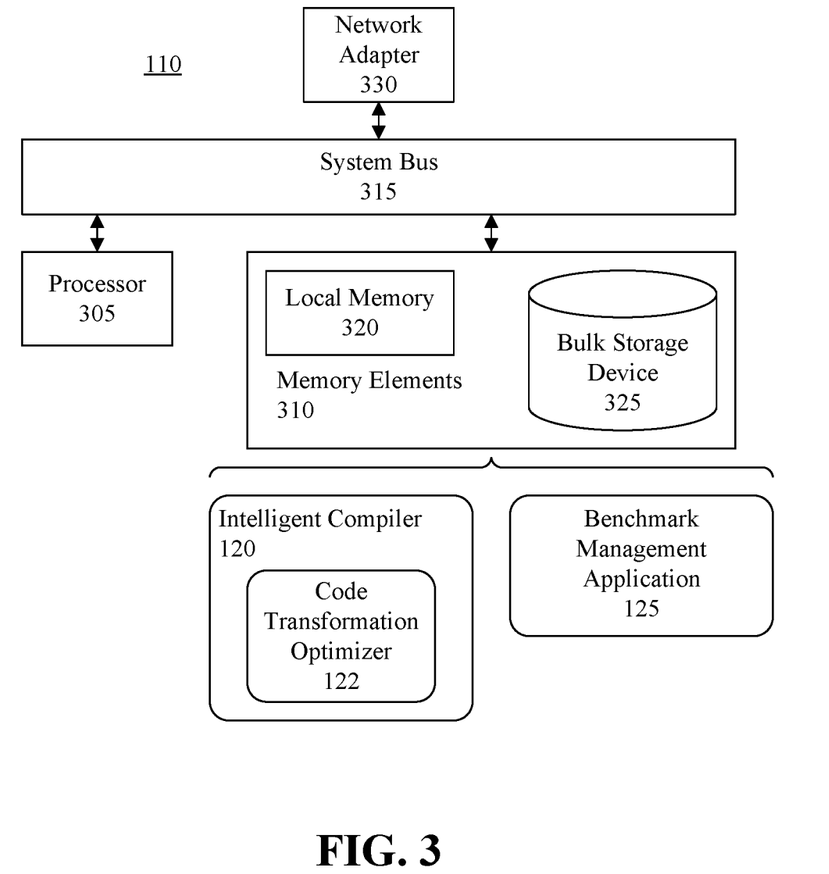
FIG. 3 is a block diagram illustrating example architecture for a data processing system.

FIG. 3 is a block diagram illustrating example architecture for the data processing system 110. The data processing system 110 can include at least one processor 305 (e.g., a central processing unit) coupled to memory elements 310 through a system bus 315 or other suitable circuitry. As such, the data processing system 110 can store program code within the memory elements 310. The processor 305 can execute the program code accessed from the memory elements 310 via the system bus 315. It should be appreciated that the data processing system 110 can be implemented in the form of any system including a processor and memory that is capable of performing the functions and/or operations described within this specification. For example, the data processing system 110 can be implemented as a server, a plurality of communicatively linked servers, a workstation, a desktop computer, a mobile computer, a tablet computer, a laptop computer, a netbook computer, a smart phone, a personal digital assistant, a set-top box, a gaming device, a network appliance, and so on.

The memory elements 310 can include one or more physical memory devices such as, for example, local memory 320 and one or more bulk storage devices 325. Local memory 320 refers to random access memory (RAM) or other non-persistent memory device(s) generally used during actual execution of the program code. The bulk storage device(s) 325 can be implemented as a hard disk drive (HDD), solid state drive (SSD), or other persistent data storage device. The data processing system 110 also can include one or more cache memories (not shown) that provide temporary storage of at least some program code in order to reduce the number of times program code must be retrieved from the bulk storage device 325 during execution.

At least one network adapter 330 can be coupled to data processing system 110 to enable the data processing system 110 to become coupled to other systems, computer systems, remote printers, and/or remote storage devices through intervening private or public networks. Modems, cable modems, transceivers, and Ethernet cards are examples of different types of network adapters 330 that can be used with the data processing system 110.

As pictured in FIG. 3, the memory elements 310 can store the components of the data processing system 110 of FIG. 1, namely the intelligent compiler 120, including the code transformation optimizer 122, and the benchmark management application 125. Being implemented in the form of executable program code, these components of the data processing system 110 can be executed by the data processing system 110 and, as such, can be considered part of the data processing system 110. Moreover, the intelligent compiler 120, code transformation optimizer 122 and benchmark management application 125 are functional data structures that impart functionality when employed as part of the data processing system 110.

Figure 4A:
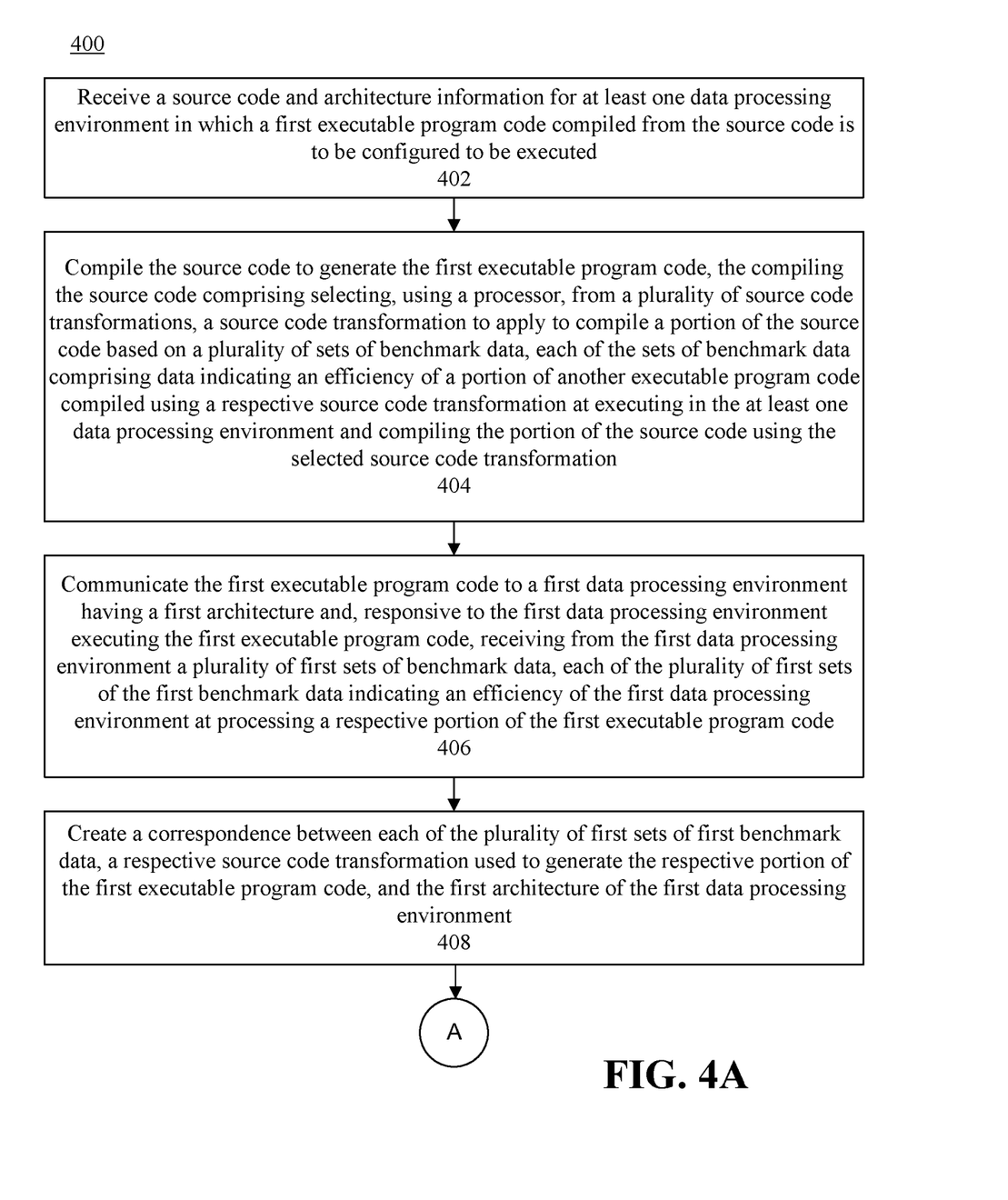
FIGS. 4A and 4B together are a flowchart illustrating an example of a method of compiling source using source code transformations selected using benchmark data.
Figure 4B:
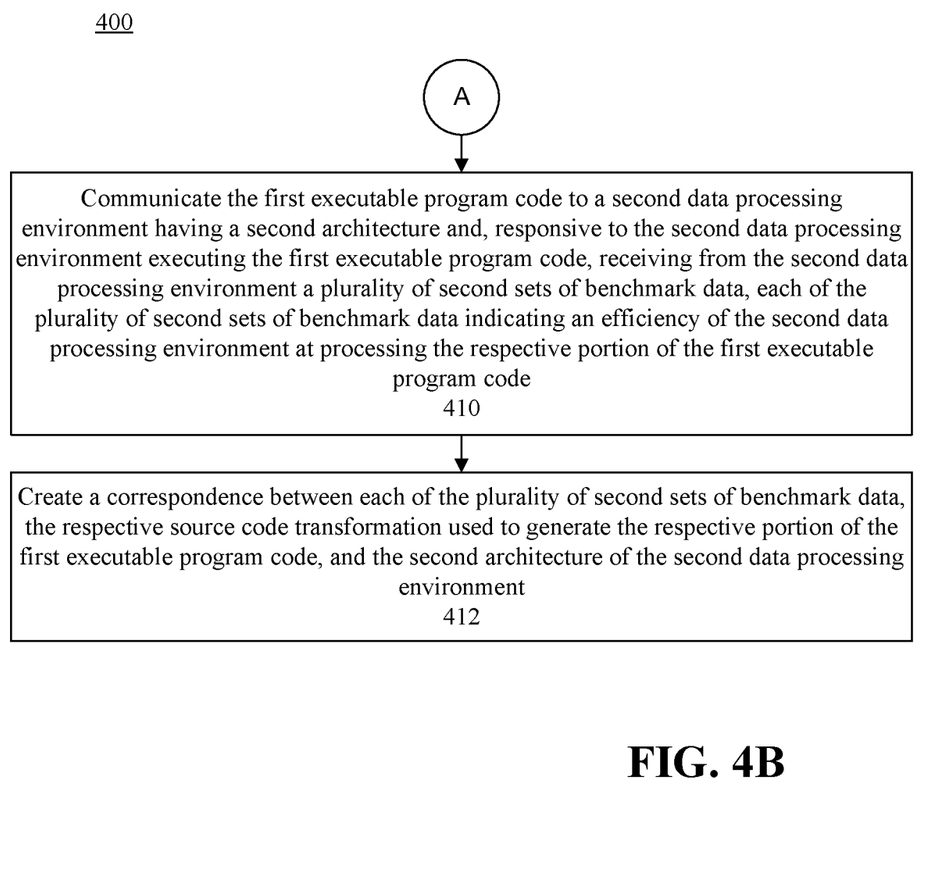

FIGS. 4A and 4B together are a flowchart illustrating an example of a method 400 of compiling source using source code transformations selected using benchmark data. The method 400 can be implemented by the data processing system 110 of FIGS. 1 and 3.

At step 402, the data processing system 110 can receive a source code and architecture information for at least one data processing environment in which a first executable program code compiled from the source code is to be configured to be executed.

At step 404, the data processing system 110 can compile the source code to generate the first executable program code. The compiling the source code can comprise, selecting, using a processor, from a plurality of source code transformations, a source code transformation to apply to compile a portion of the source code based on a plurality of sets of benchmark data, each of the sets of benchmark data comprising data indicating an efficiency of a portion of another executable program code compiled using a respective source code transformation at executing in the at least one data processing environment, and compiling the portion of the source code using the selected source code transformation.

At step 406, the data processing system can communicate the first executable program code to a first data processing environment having a first architecture and, responsive to the first data processing environment executing the first executable program code, receiving from the first data processing environment a plurality of first sets of benchmark data, each of the plurality of first sets of the first benchmark data indicating an efficiency of the first data processing environment at processing a respective portion of the first executable program code.

At step 408, the data processing system can create a correspondence between each of the plurality of first sets of first benchmark data, a respective source code transformation used to generate the respective portion of the first executable program code, and the first architecture of the first data processing environment.

At step 410, the data processing system can communicate the first executable program code to a second data processing environment having a second architecture and, responsive to the second data processing environment executing the first executable program code, receiving from the second data processing environment a plurality of second sets of benchmark data, each of the plurality of second sets of benchmark data indicating an efficiency of the second data processing environment at processing the respective portion of the first executable program code.

At step 412, the data processing system can create a correspondence between each of the plurality of second sets of benchmark data, the respective source code transformation used to generate the respective portion of the first executable program code, and the second architecture of the second data processing environment.

Figure 5:
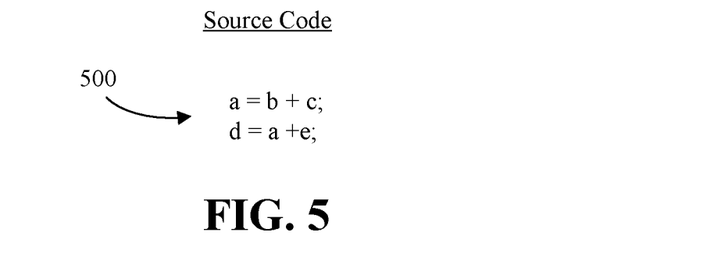
FIG. 5 illustrates an example of a portion of source code to be optimized according to an embodiment of the present invention.

FIG. 5 illustrates an example of a portion 500 of source code to be optimized according to an embodiment of the present invention.

Figure 6:
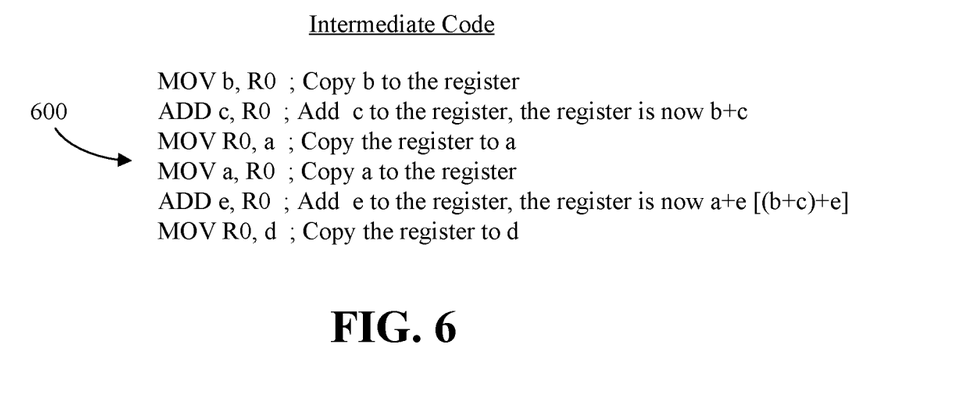
FIG. 6 illustrates an example of a portion of an intermediate code version of source code corresponding to the portion of source code of FIG. 5.

FIG. 6 illustrates an example of a portion 600 of an intermediate code version of source code corresponding to the portion 500 of source code of FIG. 5. Specifically, the portion 600 can be translated from the portion 500. In an arrangement, the intelligent compiler 150 can translate the source code to the intermediate code version. In another arrangement, the intelligent compiler 150 can receive the source code in the form of the intermediate code, in which case the intelligent compiler 150 need not be tasked with translating the source code to the intermediate code version. For example, the client device 115 or another device or system may translate the source code 500 to the intermediate code 600 version of the source code.

Figure 7:
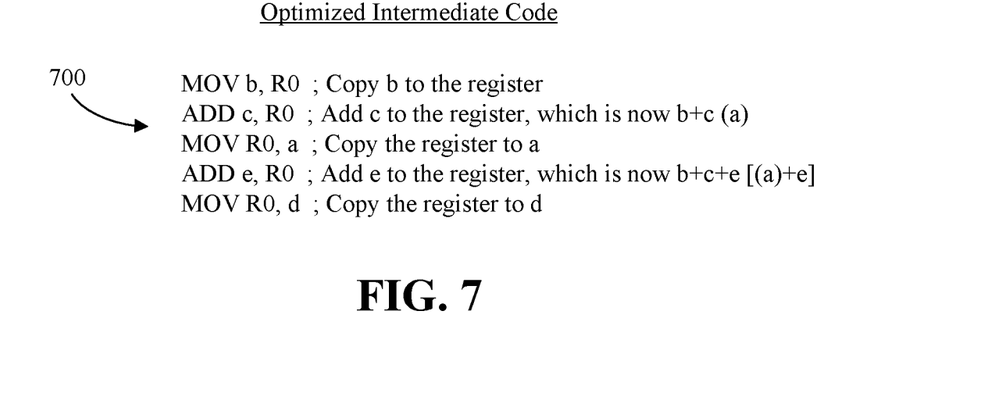
FIG. 7 illustrates an example of an optimized version of the portion of intermediate code of FIG. 6.

FIG. 7 illustrates an example of an optimized version 700 of the portion 600 of intermediate code of FIG. 6. In an arrangement, the portion 600 of the intermediate code 600 can be optimized to generate the optimized portion 700 of the intermediate code, and the intelligent compiler 150 can compile optimized version of the intermediate code. In another arrangement, rather than generating the optimized portion 700 of the intermediate code, the intelligent compiler can perform the optimization during the process of compiling the intermediate code to generate machine code. In illustration, the source code transformations 145 can be written in assembly language, but may be translated to machine code for use in compiling operations. For example, a programmer may program the source code transformations using assembly language, and an Assembler can be used to translate the assembly language to machine code. Thus, the source code transformations 145 can be compiler instructions for translating portions of source code (e.g., portions of intermediate code versions of source code). In illustration, the intelligent compiler 120 can identify the portions 600 of the intermediate code and select, from machine code versions of the source code transformations, source code transformations to use while compiling the source code to executable program code.

The foregoing description is just an example of embodiments of the invention, and variations and substitutions. While the disclosure concludes with claims defining novel features, it is believed that the various features described herein will be better understood from a consideration of the description in conjunction with the drawings. The process (es), machine(s), manufacture(s) and any variations thereof described within this disclosure are provided for purposes of illustration. Any specific structural and functional details described are not to be interpreted as limiting, but merely as a basis for the claims and as a representative basis for teaching one skilled in the art to variously employ the features described in virtually any appropriately detailed structure. Further, the terms and phrases used within this disclosure are not intended to be limiting, but rather to provide an understandable description of the features described.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "includes," "including," "comprises," and/or "comprising," when used in this disclosure, specify the presence of stated features, integers, steps, operations, elements, and/or components, but do not preclude the presence or addition of one or more other features, integers, steps, operations, elements, components, and/or groups thereof.

Reference throughout this disclosure to "one embodiment," "an embodiment," "one arrangement," "an arrangement," "one aspect," "an aspect," or similar language means that a particular feature, structure, or characteristic described in connection with the embodiment is included in at least one embodiment described within this disclosure. Thus, appearances of the phrases "one embodiment," "an embodiment," "one arrangement," "an arrangement," "one aspect," "an aspect," and similar language throughout this disclosure may, but do not necessarily, all refer to the same embodiment.

The term "plurality," as used herein, is defined as two or more than two. The term "another," as used herein, is defined as at least a second or more. The term "coupled," as used herein, is defined as connected, whether directly without any intervening elements or indirectly with one or more intervening elements, unless otherwise indicated. Two elements also can be coupled mechanically, electrically, or communicatively linked through a communication channel, pathway, network, or system. The term "and/or" as used herein refers to and encompasses any and all possible combinations of one or more of the associated listed items. It will also be understood that, although the terms first, second, etc. may be used herein to describe various elements, these elements should not be limited by these terms, as these terms are only used to distinguish one element from another unless stated otherwise or the context indicates otherwise.

The term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method, comprising:
receiving a source code and architecture information for at least one data processing environment in which a first executable program code compiled from the source code is to be configured to be executed;
compiling the source code to generate the first executable program code, the compiling the source code comprising:
selecting, using a processor, from a plurality of source code transformations, a source code transformation to apply to compile a portion of the source code based on a plurality of sets of benchmark data, each of the sets of benchmark data comprising data indicating an efficiency of a portion of another executable program code compiled using a respective source code transformation at executing in the at least one data processing environment; and
compiling the portion of the source code using the selected source code transformation.

2. The method of claim 1, further comprising:
communicating the first executable program code to a first data processing environment having a first architecture and, responsive to the first data processing environment executing the first executable program code, receiving from the first data processing environment a plurality of first sets of benchmark data, each of the plurality of first sets of the first benchmark data indicating an efficiency of the first data processing environment at processing a respective portion of the first executable program code; and
creating a correspondence between each of the plurality of first sets of first benchmark data, a respective source code transformation used to generate the respective portion of the first executable program code, and the first architecture of the first data processing environment.

3. The method of claim 2, further comprising:
communicating the first executable program code to a second data processing environment having a second architecture and, responsive to the second data processing environment executing the first executable program code, receiving from the second data processing environment a plurality of second sets of benchmark data, each of the plurality of second sets of benchmark data indicating an efficiency of the second data processing environment at processing the respective portion of the first executable program code; and
creating a correspondence between each of the plurality of second sets of benchmark data, the respective source code transformation used to generate the respective portion of the first executable program code, and the second architecture of the second data processing environment.

4. The method of claim 1, wherein the compiling the portion of the source code using the selected source code transformation comprises replacing a portion of an intermediate code version of the source code with the selected source code transformation.

5. The method of claim 4, wherein at least one of the plurality of source code transformations implements a peephole optimization, wherein the peephole optimization is an optimization of a set of instructions of the intermediate code version of the source code to be compiled that includes less than a threshold number of instructions.

6. The method of claim 1, wherein at least one of the plurality of source code transformations implements a peephole optimization, wherein the peephole optimization is an optimization of a set of instructions of the source code to be compiled that includes less than a threshold number of instructions.

7. The method of claim 1, wherein the architecture information indicates a type of processor and a type of memory of the at least one data processing environment in which the first executable program code is to be configured to be executed.

8. A system, comprising:
a processor programmed to initiate executable operations comprising:
receiving a source code and architecture information for at least one data processing environment in which a first executable program code compiled from the source code is to be configured to be executed;

compiling the source code to generate the first executable program code, the compiling the source code comprising:
   selecting from a plurality of source code transformations, a source code transformation to apply to compile a portion of the source code based on a plurality of sets of benchmark data, each of the sets of benchmark data comprising data indicating an efficiency of a portion of another executable program code compiled using a respective source code transformation at executing in the at least one data processing environment; and
   compiling the portion of the source code using the selected source code transformation.

9. The system of claim 8, the executable operations further comprising:
   communicating the first executable program code to a first data processing environment having a first architecture and, responsive to the first data processing environment executing the first executable program code, receiving from the first data processing environment a plurality of first sets of benchmark data, each of the plurality of first sets of the first benchmark data indicating an efficiency of the first data processing environment at processing a respective portion of the first executable program code; and
   creating a correspondence between each of the plurality of first sets of first benchmark data, a respective source code transformation used to generate the respective portion of the first executable program code, and the first architecture of the first data processing environment.

10. The system of claim 9, the executable operations further comprising:
   communicating the first executable program code to a second data processing environment having a second architecture and, responsive to the second data processing environment executing the first executable program code, receiving from the second data processing environment a plurality of second sets of benchmark data, each of the plurality of second sets of benchmark data indicating an efficiency of the second data processing environment at processing the respective portion of the first executable program code; and
   creating a correspondence between each of the plurality of second sets of benchmark data, the respective source code transformation used to generate the respective portion of the first executable program code, and the second architecture of the second data processing environment.

11. The system of claim 8, wherein the compiling the portion of the source code using the selected source code transformation comprises replacing a portion of an intermediate code version of the source code with the selected source code transformation.

12. The system of claim 11, wherein at least one of the plurality of source code transformations implements a peephole optimization, wherein the peephole optimization is an optimization of a set of instructions of the intermediate code version of the source code to be compiled that includes less than a threshold number of instructions.

13. The system of claim 8, wherein at least one of the plurality of source code transformations implements a peephole optimization, wherein the peephole optimization is an optimization of a set of instructions of the source code to be compiled that includes less than a threshold number of instructions.

14. The system of claim 8, wherein the architecture information indicates a type of processor and a type of memory of the at least one data processing environment in which the first executable program code is to be configured to be executed.

15. A computer program product, comprising:
   a computer readable storage medium having program code stored thereon, the program code executable by a data processing system to initiate operations including:
   receiving a source code and architecture information for at least one data processing environment in which a first executable program code compiled from the source code is to be configured to be executed;
   compiling the source code to generate the first executable program code, the compiling the source code comprising:
      selecting from a plurality of source code transformations, a source code transformation to apply to compile a portion of the source code based on a plurality of sets of benchmark data, each of the sets of benchmark data comprising data indicating an efficiency of a portion of another executable program code compiled using a respective source code transformation at executing in the at least one data processing environment; and
      compiling the portion of the source code using the selected source code transformation.

16. The computer program product of claim 15, wherein the program code is executable by the data processing system to initiate operations further comprising:
   communicating the first executable program code to a first data processing environment having a first architecture and, responsive to the first data processing environment executing the first executable program code, receiving from the first data processing environment a plurality of first sets of benchmark data, each of the plurality of first sets of the first benchmark data indicating an efficiency of the first data processing environment at processing a respective portion of the first executable program code; and
   creating a correspondence between each of the plurality of first sets of first benchmark data, a respective source code transformation used to generate the respective portion of the first executable program code, and the first architecture of the first data processing environment.

17. The computer program product of claim 16, wherein the program code is executable by the data processing system to initiate operations further comprising:
   communicating the first executable program code to a second data processing environment having a second architecture and, responsive to the second data processing environment executing the first executable program code, receiving from the second data processing environment a plurality of second sets of benchmark data, each of the plurality of second sets of benchmark data indicating an efficiency of the second data processing environment at processing the respective portion of the first executable program code; and
   creating a correspondence between each of the plurality of second sets of benchmark data, the respective source code transformation used to generate the respective portion of the first executable program code, and the second architecture of the second data processing environment.

18. The computer program product of claim 15, wherein the compiling the portion of the source code using the selected source code transformation comprises replacing a portion of an intermediate code version of the source code with the selected source code transformation.

19. The computer program product of claim 18, wherein at least one of the plurality of source code transformations implements a peephole optimization, wherein the peephole optimization is an optimization of a set of instructions of the intermediate code version of the source code to be compiled that includes less than a threshold number of instructions.

20. The computer program product of claim 15, wherein at least one of the plurality of source code transformations implements a peephole optimization, wherein the peephole optimization is an optimization of a set of instructions of the source code to be compiled that includes less than a threshold number of instructions.

* * * * *